US011026039B2

(12) United States Patent
Vanne

(10) Patent No.: US 11,026,039 B2
(45) Date of Patent: Jun. 1, 2021

(54) ARRANGEMENT FOR DISTRIBUTING HEAD RELATED TRANSFER FUNCTION FILTERS

(71) Applicant: OwnSurround Oy, Kuopio (FI)

(72) Inventor: Antti J. Vanne, Los Gatos, CA (US)

(73) Assignee: OwnSurround OY, Kuopio (FI)

( * ) Notice: Subject to any disclaimer, the term of this patent is extended or adjusted under 35 U.S.C. 154(b) by 0 days.

(21) Appl. No.: 16/516,036

(22) Filed: Jul. 18, 2019

(65) Prior Publication Data
US 2020/0053502 A1 Feb. 13, 2020

(51) Int. Cl.
*H04S 7/00* (2006.01)
*H04L 29/08* (2006.01)

(52) U.S. Cl.
CPC .............. *H04S 7/303* (2013.01); *H04L 67/16* (2013.01); *H04S 2420/01* (2013.01)

(58) Field of Classification Search
CPC .................................................. H04S 2420/01
See application file for complete search history.

(56) References Cited

U.S. PATENT DOCUMENTS

| 6,996,244 | B1 | 2/2006 | Slaney et al. |
| 8,483,450 | B1 | 9/2013 | Derakhshani |
| 9,544,706 | B1 | 1/2017 | Hirst |
| 10,038,966 | B1 * | 7/2018 | Mehra .................... H04R 5/033 |
| 10,149,089 | B1 | 12/2018 | Edry |
| 2003/0074174 | A1 | 4/2003 | Fu et al. |
| 2007/0201713 | A1 | 8/2007 | Fang et al. |
| 2007/0270988 | A1 * | 11/2007 | Goldstein ................ H04R 5/04 700/94 |
| 2012/0183161 | A1 | 7/2012 | Agevik et al. |
| 2013/0051565 | A1 | 2/2013 | Pontoppidan |
| 2013/0169779 | A1 | 7/2013 | Pedersen |
| 2014/0153727 | A1 | 6/2014 | Walsh |
| 2014/0343900 | A1 | 11/2014 | Goldstein et al. |
| 2014/0355765 | A1 | 12/2014 | Kulavik et al. |
| 2015/0010160 | A1 | 1/2015 | Udesen |
| 2016/0057552 | A1 | 2/2016 | Kure et al. |

(Continued)

FOREIGN PATENT DOCUMENTS

| CN | 102984637 A | 3/2013 |
| CN | 103455824 A | 12/2013 |

(Continued)

OTHER PUBLICATIONS

Extended European Search Report dated Aug. 7, 2019 for European Patent Application No. 19153780.2; 6 Pages.

(Continued)

*Primary Examiner* — Kile O Blair
(74) *Attorney, Agent, or Firm* — Womble Bond Dickinson (US) LLP

(57) ABSTRACT

Arrangement for distributing head related transfer function filters. In the arrangement a user device sends a request for a head related transfer function filter to the service being used. The service verifies if the user of the device has a subscription for a head related transfer function filters in the service being used and retrieves a filter as a response to a positive verification result. The service may filter audio channels and transmit filtered audio further. In an alternative embodiment the service transmits the filter to the user device for filtering the audio.

22 Claims, 3 Drawing Sheets

(56) References Cited

U.S. PATENT DOCUMENTS

| | | | |
|---|---|---|---|
| 2016/0100268 A1 | 4/2016 | Stein | |
| 2016/0227999 A1 | 8/2016 | An et al. | |
| 2017/0153727 A1 | 6/2017 | Park | |
| 2018/0091921 A1* | 3/2018 | Silva | G06T 15/08 |
| 2018/0204341 A1 | 7/2018 | Kaneko | |
| 2018/0249275 A1 | 8/2018 | Ghorbal et al. | |
| 2019/0045317 A1 | 2/2019 | Badhwar et al. | |
| 2019/0304081 A1 | 10/2019 | Vanne et al. | |

FOREIGN PATENT DOCUMENTS

| | | |
|---|---|---|
| CN | 104284286 A | 1/2015 |
| CN | 104869524 A | 8/2015 |
| CN | 104956689 A | 9/2015 |
| CN | 107734428 A | 2/2018 |
| FR | 3011373 | 4/2015 |
| FR | 3011373 A1 | 4/2015 |
| FR | 3040807 | 3/2017 |
| FR | 3040807 A1 A1 | 3/2017 |
| WO | 03086007 | 10/2003 |
| WO | WO03086007 A2 | 10/2003 |
| WO | 2008008730 | 1/2008 |
| WO | WO2008008730 A2 | 1/2008 |
| WO | 2012028906 | 3/2012 |
| WO | WO 2012028906 A1 | 3/2012 |
| WO | 2013130010 | 9/2013 |
| WO | WO2013130010 | 9/2013 |
| WO | 2015017914 | 2/2015 |
| WO | WO2015017914 A1 | 2/2015 |
| WO | 2017047309 | 3/2017 |
| WO | WO 2017047309 A1 | 3/2017 |
| WO | WO2017116308 A | 7/2017 |
| WO | 2017158232 | 9/2017 |
| WO | WO2017158232 | 9/2017 |

OTHER PUBLICATIONS

Finnish Search Report for FI Application No. 20185300 dated Nov. 13, 2018, 2 pages.
Finnish Office Action for FI Application No. 20185300 dated Nov. 13, 2018, 5 pages.
Dellepiane, M., et al., "Reconstructing head models from photographs for individualized 3D-audio processing," Pacific Graphics, vol. 27, No. 7, 2008, pp. 1719-1727.
Torres-Gallegos, Edgar A., et al., "Personalization of head-related transfer functions (HRTF) based on automatic photo-anthropometry and inference from a database," Applied Acoustics, vol. 97, 2015, pp. 84-95.
Jin C., et al., "Enabling Individualized Virtual Auditory Space Using Morphological Measurements", ResearchGate, (Jan. 2000), 5 pages.
Finnish Office Action for FI Application No. 20185678 dated Feb. 26, 2019, 6 pages.
Finnish Search Report dated May 2, 2019 for Finnish Application No. 20165211; 6 Pages.
International Search Report and Written Opinion for Application No. PCT/FI2017/050156 dated May 19, 2017, 15 pages.
Sibbing, D. et al., "Markerless Reconstruction of Dynamic Facial Expressions", 2009 IEEE 12th International Conference on Computer Vision Workshops, ICCV Workshops (2009), pp. 1778-1785.
Guillon, P., et al., "Head-Related Transfer Function Customization by Frequency Scaling and Rotation Shift Based on a New Morphological Matching Method", Audio Engineering Society, Convention Paper 7550, (2008), pp. 1028-1041.
Huttunen, T. et al., "Rapid Generation of Personalized HRTFs", AES 55th International Conference, (2014), pp. 56-61.
Finnish Office Action for Finnish Application No. 20165211 dated Jun. 2, 2017, 6 pages.
Finnish Search Report dated Nov. 2, 2016 for Finnish Application No. 20165211, 8 pages.
Finnish Search Report for FI Application No. 20185300 dated Nov. 13, 2018.
Finnish Office Action for FI Application No. 20185300 dated Nov. 13, 2018.
Torres-Gallegos, Edgar A., et al., "Personalization of head-related transfer functions (HRTF) based on automatic photo-anthropometry and inference from a database," Applied Acoustics, vol. 95, 2015, pp. 84-95.
Jin C., et al., "Enabling Individualized Virtual Auditory Space Using Morphological Measurements", ResearchGate, (Jan. 2000), 4 pages.
Finnish Office Action for FI Application No. 20185678 dated Feb. 26, 2019.
Finnish Search Report dated May 2, 2019 for related Finnish Application No. 20165211; 6 Pages.
V. Ralph Algazi, et al.; "Approximating the Head-Related Transfer Function Using Simple Geometric Models of the Head and Torso"; J. Acoustical Society of America. Dated Nov. 1, 2002; 12 pp.
Makoto Otani, et al.; "A Fast Calculation Method of the Head-Related Transfer Functions for Multiple Source Poits Based on the Boundary Element Method"; Acoust. Sci. & Tech. May 27, 2003; 8pp.
Notice of Allowance for U.S. Appl. No. 16/357,193, filed Mar. 18, 2019; 9 pp (dated Oct. 29, 2020).
Non-Final Office Action for U.S. Appl. No. 16/357,193, filed Mar. 18, 2019; 13 pp (dated Jul. 24, 2020).
Finish Search Report for FI Application No. 20185678 dated Feb. 26, 2019; 2 pp.
Office Action for FI Application No. 20185678 dated Feb. 26, 2019; 6 pp.
First Office Action for Chinese Application No. 201910738957.9 dated Nov. 27, 2020, 14 pp.
Chinese Office Action dated Mar. 3, 2021 for related Chinese Application No. 201780016802.3; 12 pages.
Finnish Office Action dated Jan. 13, 2021 for related Finnish Application No. 20185300; 6 pages.

\* cited by examiner

ARRANGEMENT FOR DISTRIBUTING HEAD RELATED TRANSFER FUNCTION FILTERS

CROSS-REFERENCE TO RELATED APPLICATIONS

This application claims priority to Finnish Patent Application No. 20185678, filed Aug. 13, 2018, is specifically incorporated by reference herein as if set forth in its entirety.

BACKGROUND

Audio systems with multiple audio channels are commonly known and used by entertainment industry, for example in movies or computer games. These systems are often called Surround Sound systems or three-dimensional sound systems. Recently arrangements for implementing even better three-dimensional sound experience have been introduced. These arrangements do not only have multiple audio channels but provide object-based audio for improving the listening experience.

In conventional approaches each of the multiple audio channels are provided to the user of the sound system. Typically audio channels are received at an amplifier or similar device that distributes the audio channel to respective speakers that have been connected to the amplifier. The amplifier may modify the received audio channels so that the playback is adjusted to the number and locations of speakers.

Recently arrangements for providing similar experience using headphones have been developed. Typically in headphone listening these arrangements are based on filtering the sound channels using so called head related transfer function filters. The three-dimensional experience is produced by manipulating sounds in headphones two audio channels so that they resemble directional sounds arriving at the ear-canal. The three-dimensional sound experience is possible by taking into account the effect of pinna, head and torso to the sound that enters to the ear-canal. These filters are often called HRTF-filters (Head-Related Transfer Function). These filters are used to provide an effect that is similar to how a human experiences sounds arriving from different directions and distances. When the anatomy of body parts, such as ears, head and torso, of a person is known a personal HRTF-filter can be produced so that the sound experienced through headphones is as realistic as possible.

The field of providing realistic audio systems is under constant development. Thus, there is a need for improvements both in audio quality and efficient distribution of the audio.

SUMMARY

Arrangement for distributing head related transfer function filters. In the arrangement a user device sends a request for a head related transfer function filter to the service being used. The service verifies if the user of the device has a subscription for a head related transfer function filters in the service being used and retrieves a filter as a response to a positive verification result. The service may filter audio channels and transmit filter audio further. In an alternative embodiment the service transmits the filter to the user device for filtering the audio.

In an aspect a method for distributing a head related transfer function filter is disclosed. In the method first a request for a service from a user device is received. Then, the availability a subscription of a HRTF-filter for the requested service is determined. If the service is available, the method further comprises sending a request for a filter to a filter server. As a response to the sent request a filter from a filter server is received. The filter is a head related transfer function filter that is designed for the user and possibly also for the device, audio format or the listening setup that the user is using.

In one embodiment the method further comprises filtering audio channel using the received filter and transmitting the filtered audio channel to the requesting user device. In another embodiment the method further comprises transmitting the received filter to the requesting user device for filtering the audio channel at the requesting device.

It is beneficial to implement the retrieval of the filter in the server or service the user actually is wishing to use. This enables possibility for the service to check if the user has enabled the head related transfer filter in the particular service and a correct filter can be retrieved based on the service information. Furthermore, when service filters audio channels there is no need for transmitting original audio channels and transmission bandwidth can be saved.

In an implementation the filtering comprises filtering a number of audio channels into a smaller number of audio channels. This is beneficial as it reduces bandwidth.

In an implementation the smaller number of audio channels is two. This is beneficial particularly when the user is using headphones with only two channels. This provides a possibility to use three-dimensional, possibly with multiple sound sources, audio channels with bandwidth of two channels.

In an implementation the request for a filter comprises at least one of the following: user identification, application identification and user device identification. It is beneficial that the filter can be chosen by using all parameters that can have an effect to audio production.

In an implementation the user device comprises headphones. It is beneficial that the filter can be generated to specific headphone models so that they take into account differences in frequency response between different headphone models.

In an aspect a computer program for a server is disclosed. The computer program comprises code adapted to cause the method as disclosed above.

In another aspect an apparatus is disclosed. The apparatus comprises at least one processor configured to execute computer programs; at least one memory configured to store computer programs and related data; and at least one data communication interface (113) configured to communicate with external data communication networks. The apparatus is configured to perform a method as disclosed above. The method may be caused by a computer program as disclosed above.

BRIEF DESCRIPTION OF THE DRAWINGS

The accompanying drawings, which are included to provide a further understanding of an arrangement for distributing head related transfer function filters and constitute a part of this specification, illustrate embodiments and together with the description help to explain the principles of the arrangement for distributing head related transfer function filters. In the drawings.

DETAILED DESCRIPTION

Reference will now be made in detail to the embodiments, examples of which are illustrated in the accompanying drawings.

In the following examples of FIGS. 1-3 the most common application of headphone listening is described. However, similar principles may be used in filtering sound for different loudspeaker arrangements.

Figure 1:
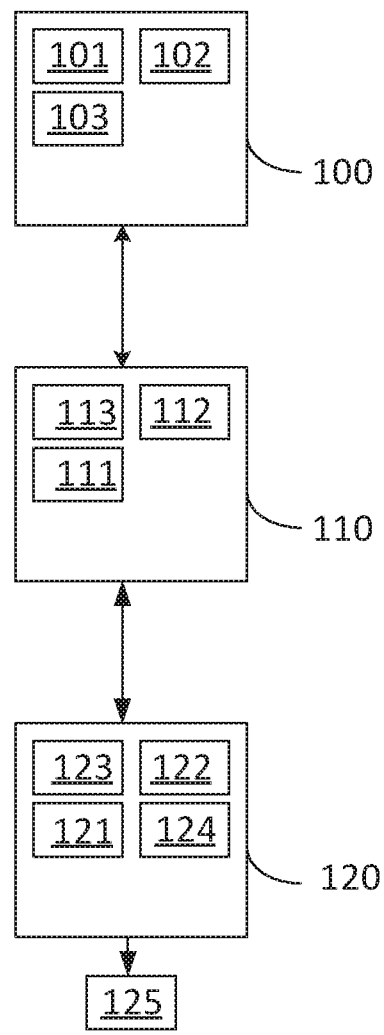
FIG. 1 is an example of an apparatus in an example system for distributing head related transfer function filters.

In FIG. 1 an example of a system comprising an apparatus 100 configured to distribute head related transfer function filters, an apparatus 110 configured to provide a streaming service and an end user apparatus 120 configured to receive and repeat the stream.

The apparatus 100 is typically operated by a service provider and may be implemented in a form of a server, cloud computing resource, database or similar to which requests for retrieving a pre-stored head related transfer function filter.

The apparatus 100 comprises at least one processor 101, at least one memory 102 and at least one network connection 103. The at least one memory is may comprise volatile and non-volatile memories. Typically it includes at least one non-volatile memory to which head related transfer function filters belonging to different users are stored. The at least one memory 102 may include a database and it is not necessary physically in the one and same device but may take a form of several different computing units that form one logical service or computing resource.

The apparatus 100 is configured to receive requests through a network connection 103. The network connection may be any commonly known interface to data communication networks, such as Internet.

The requests that are received through the network connection 103 are processed by the at least one processor 101. The request is processed so that from the request an identification of a head related transfer function filter is extracted and the corresponding head related transfer function filter is retrieved and provided as a response to the request using the at least one network connection 103.

The identification identifying the head related transfer function filter may be unique to a user or even unique to different devices or device models that have been assigned to a certain persons. Thus, it is possible that one person has several head related transfer function filters stored and in addition to the user the request identifies the device to which the user is retrieving the head related transfer function filter.

The apparatus 110 configured to provide a streaming service, such as a music or movie service or any other service that includes providing an audio stream with or without other information. The apparatus 110 comprises at least one processor 111, at least one memory 112 and at least one network connection. The at least one memory 112 may include a database and it is not necessary physically in the one and same device but may take a form of several different computing units that form one logical service or computing resource.

The apparatus 110 receives service requests through the network connection 113 and processes them using the at least one processor 111. Based on the request the apparatus 110 extracts an identification for a head related transfer function filter from the service request and produces a request including the identification. The produced request is then sent to the apparatus 110. As a response to the request the apparatus 110 receives a head related transfer function filter from the apparatus 100 that has provided it as a response to the request. The received head related transfer function filter is store in the at least one memory 112.

After receiving the head related transfer function filter the apparatus 110 provides the request streaming service to the end user apparatus 120 that has requested the streaming service. The service stream is modified from the standard stream so that the apparatus 110 processes using the at least one processor 111 the audio stream, which is possible associated with additional information. For example, the audio stream may be a sound track of a movie that is played together with the video stream of the movie. When processing the audio stream the apparatus 110 is configured to use the received head related transfer function filter to form a filtered audio stream that comprises typically two channels. This reduces the need for data transmission bandwidth and also removes the need for an end user device that is capable of modify the audio stream in accordance with the head related transfer function. Furthermore, the need for computing power at the end user device is reduced when the demanding computations are done at the service provider side.

The end user apparatus 120 is typically a computer, tablet device such as iPad or a mobile phone to which headphones 125 have been attached to. The end user apparatus comprises at least one processor 121, at least one memory 122, at least one network connection 123 and at least one audio device 124 that is capable of producing sounds using headphones 125. The end user sends a request for a streaming service to the apparatus 110 and as a response receives a stream transmitted by the apparatus 120. The at least one processor 121 processes the received stream that typically requires to be decoded. Then the audio part of the stream is transmitted to the audio device 124 that provides the audio stream in suitable format to the headphones 125.

In the arrangement described above the information of the availability of a head related transfer function may be included in the subscription information that is typically stored at the apparatus 110. The initial request received from the end user device may have further information about which head related transfer function filter is received if any. This facilitates possibility to share the subscription, for example, within a family.

Figure 2:
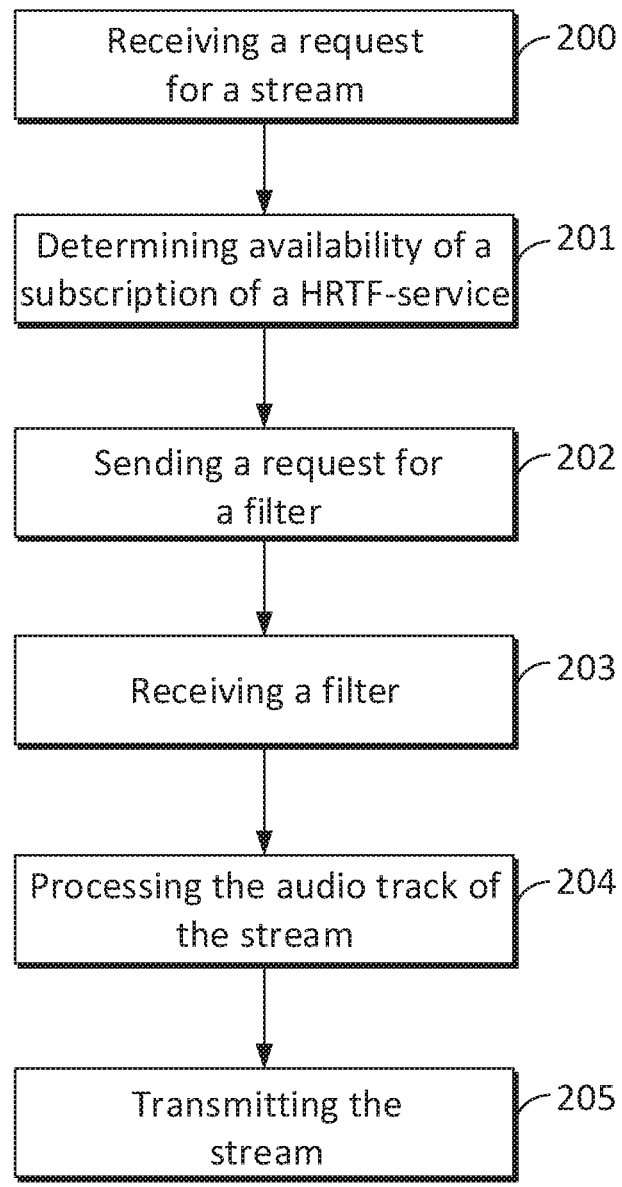
FIG. 2 is an example of a method for distributing head related transfer function filters.

In FIG. 2 an example method is illustrated. The method of FIG. 2 is implemented in a streaming service or similar. Typically this kind of streaming service is implemented using a computing resource comprising a number of servers that operate together for providing the service to a large number of clients. In the following description the service is referred as a one server, however, this should be understood that it may be, and in many cases is, a virtual server that looks like one service to the client.

The method at the server is initiated when the server, such as the apparatus 110 of FIG. 1, receives a request for streaming service from an end user device, such as the apparatus 120, step 200. The initiation may include several tasks, such as authentication of the user, determining the subscribed service level and choosing a stream, such as a movie, to be streamed. Furthermore, the request may include information with regard the service level the user is wishing to have, such as the preferred resolution or sound quality.

The determination of service level may relate to checking allowed number of simultaneous streams, image quality or audio quality. The determining of used audio quality includes determination of subscription of head related transfer function filter service, step 201. This information may be stored into the user information at the streaming service or it may be requested from a server providing the actual head related transfer function filter or both. It is possible to implement also alternative methods for checking the availability of the subscription may be used.

If the user has indicated that he is wishing to use headphones with audio track enhanced using head related transfer function filters and the person has an appropriate subscription for the service, the streaming server sends a request for a head related transfer function filter to a head related transfer function filter service, such as the apparatus 100 of FIG. 100, step 202. The request may include, for example, the identification of the person wishing to have a head related transfer function filter and the identification of the headphones being used. In addition to identification of headphones used also type of the application, audio format being used and similar may be identified using similar identification. It is noted, that the request may contain request for several people if a plurality of persons are wishing to receive the same stream simultaneously at the same venue. This happens, for example, when two persons are watching the same movie.

As a response to the request a head related transfer function filter is received, step 203. The filter, or a plurality of filters, is stored to the streaming service for later use. The filter is then used in processing the audio track of the stream, step 204. Modern movies may have a very high number of audio channels or audio sources. The streaming service processes the audio track into two channels of headphones using the received head related transfer function, step 204. This reduces the required bandwidth for transmitting the audio track. It is noted that even if the streaming service produces individual audio tracks for a plurality of users the bandwidth may still be saved as only two channels per person are needed instead of the typically high number of audio channels and sources that are available in modern movies.

Finally the streaming server transmits the stream to the user or users, step 205. Users receive their customized audio tracks at their headphones. The sound produced at the headphones is realistic and provides three-dimensional feeling of the audio scene. This increases the user experience by facilitating experiencing the produced audio as it was produced by high number of speakers or experienced in live.

The example disclosed in FIGS. 1 and 2 is providing a streaming service that includes modifying the content of transmitted signals in a manner that as a result the physical signal sent to the final user is different to arrangements where audio signals are not modified.

Figure 3:
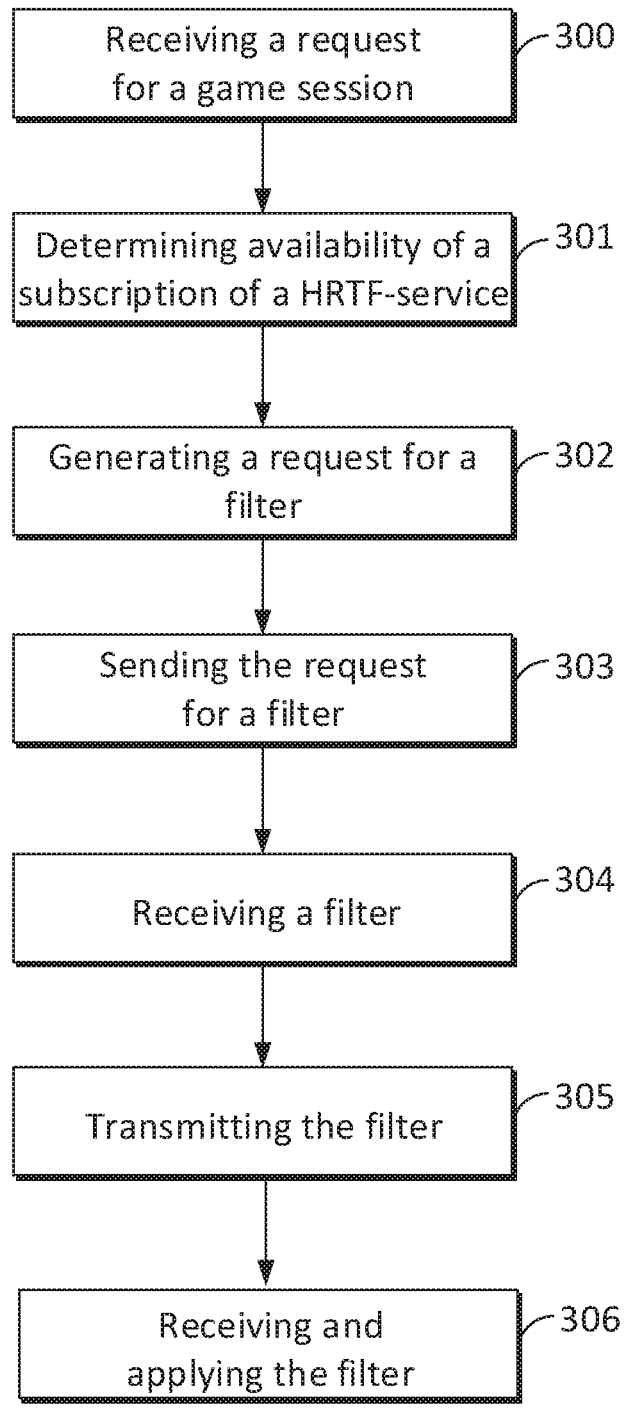
FIG. 3 is another example of a method for distributing head related transfer function filters.

In FIG. 3 another example of a method that can be used in an arrangement similar to the arrangement of FIG. 1 is disclosed. The method of the example is initiated by receiving a request for a game session, step 300. The game session differs as an application from streaming services as it typically requires faster, preferably real-time, to game events and user movements.

The availability of the HRTF-subscription, at step 301, may be determined as it was determined for streaming services. Based on the availability information a request for a filter is generated, step 302. In this example the request for a filter comprises additional information. This additional information may be, for example, a description of the space where the user of the game is currently located so that the filter will be able to produce audio that fits to the space. The request may be, and typically is, formed in view of the requesting application, which is a game in this context. Thus, the request comprises information about the user for verifying the subscription and also for retrieving the body metrics that are useful in generating or selecting the requested filter.

Then the request is sent to a filter service, step 303. The filter service may select a filter that has been produced earlier for the user or generate a filter specifically matching with the request. Then the filter is received at the requesting device, step 304. Then, the filter is transmitted further to the device the user is using, step 305. This step may include additional steps, such as, switching the audio mode of the game into a specific mode that takes the filter at the user end into account.

Finally, the user receives at the user device the filter and starts applying it to the audio track belonging to the game, step 306. The user device and the filter now produce and audio experience in a manner that the game server is assuming by modifying the audio tracks so that the actual sound signals are modified and thus different when compared to an audio track without filter.

The examples above are focusing on a single person using headphones or a space where other people are not disturbed. However, similar principles may be used using loudspeaker arrangements for a group of people where one or more devices are using the same loudspeaker arrangement. For example, in a car it is possible that the music is played to all people but navigation instructions are filtered so that they can be heard at the driver's seat but in a manner the listening to the music is not disturbed for other people. In such case, the car is the user device and it is typically connected to a server, such as car manufacturer's server, and it may request one or more filters, for example, based on the occupancy of the car.

As stated above, the components of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Common forms of computer-readable media can include, for example, a floppy disk, a flexible disk, hard disk, magnetic tape, any other suitable magnetic medium, a CD-ROM, CD+R, CD+RW, DVD, DVD-RAM, DVD+RW, DVD+R, HD DVD, HD DVD-R, HD DVD-RW, HD DVD-RAM, Blu-ray Disc, any other suitable optical medium, a RAM, a PROM, and EPROM, a FLASH-EPROM, any other suitable memory chip or cartridge, or any other suitable medium from which a computer can read.

It is obvious to a person skilled in the art that with the advancement of technology, the basic idea of an arrangement for distributing head related transfer function filters may be implemented in various ways. The arrangement for distributing head related transfer function filters and its embodiments are thus not limited to the examples described above; instead they may vary within the scope of the claims.

What is claimed is:

1. A method for distributing a head related transfer function filter comprising:
   receiving a request for a service from an application on a user device;
   determining availability of a subscription for a HRTF-filter for the requested service;
   sending a request for a filter to a filter server;
   receiving the filter from the filter server;
   determining whether the application is a game application requesting a game service; and in response to determining that the application is the game application requesting the game service,
transmitting the received filter to the requesting user device for filtering an audio channel at the requesting user device, and
switching an audio mode of the game service to account for the filter being used to filter the audio channel at the requesting user device.

2. The method of claim 1, wherein the filtering comprises filtering a number of audio channels into a smaller number of audio channels.

3. The method of claim 2, wherein the smaller number of audio channels is two.

4. The method of claim 1, wherein the request for the filter comprises identification of the application as being for the game service.

5. The method of claim 1, wherein the request for the filter comprises identification of an audio format.

6. The method of claim 1, wherein the user device comprises headphones.

7. The method of claim 1, wherein the request for the filter comprises identification of a model of headphones being used by the user device to reproduce sounds, and wherein the filter is unique to and takes into account a frequency response of the model of headphones.

8. The method of claim 1, wherein determining whether the application is the game application includes determining whether the application is the game application requesting the game service or a streaming application requesting a streaming service, and further comprising:
in response to determining that the application is the streaming application requesting the streaming service, processing an audio track of a stream using the filter, and
transmitting the processed audio track to the requesting user device.

9. A non-transitory computer readable medium storing instructions, which when executed by a server, cause the server to perform a method comprising:
receiving a request for a service from an application on a user device;
determining availability of a subscription for a HRTF-filter for the requested service;
sending a request for a filter to a filter server;
receiving the filter from the filter server;
determining whether the application is a game application requesting a game service; and
in response to determining that the application is the game application requesting the game service,
transmitting the received filter to the requesting user device for filtering an audio channel at the requesting device, and
switching an audio mode of the game service to account for the filter being used to filter the audio channel at the requesting user device.

10. The non-transitory computer readable medium of claim 9, wherein the filtering comprises filtering a number of audio channels into a smaller number of audio channels.

11. The non-transitory computer readable medium of claim 10, wherein the smaller number of audio channels is two.

12. The non-transitory computer readable medium of claim 9, wherein the request for the filter comprises identification of the application as being for the game service.

13. The non-transitory computer readable medium of claim 9, wherein the request for the filter comprises identification of an audio format.

14. The non-transitory computer readable medium of claim 9, wherein the user device comprises headphones.

15. The non-transitory computer readable medium of claim 9, wherein determining whether the application is the game application includes determining whether the application is the game application requesting the game service or a streaming application requesting a streaming service, and further comprising:
in response to determining that the application is the streaming application requesting the streaming service, processing an audio track of a stream using the filter, and
transmitting the processed audio track to the requesting user device.

16. An apparatus for distributing head related transfer function filters comprising:
at least one processor configured to execute computer programs;
at least one memory configured to store computer programs and related data; and
at least one data communication interface configured to communicate with external data communication networks;
wherein the at least one processor is configured by the computer programs and related data to
receive a request for a service from an application on a user device,
determine availability of a subscription for a HRTF-filter for the requested service,
send a request for a filter to a filter server,
receive the filter from the filter server,
determine whether the application is a game application requesting a game service, and
in response to determining that the application is the game application requesting the game service,
transmit the received filter to the requesting user device for filtering the audio channel at the requesting device, and
switch an audio mode of the game service to account for the filter being used to filter the audio channel at the requesting user device.

17. The apparatus of claim 16, wherein the filtering comprises filtering a number of audio channels into a smaller number of audio channels.

18. The apparatus of claim 17, wherein the smaller number of audio channels is two.

19. The apparatus of claim 18, wherein the request for the filter comprises identification of the application as being for the game service.

20. The apparatus of claim 16, wherein the request for the filter comprises identification of an audio format.

21. The apparatus of claim 16, wherein the user device comprises headphones.

22. The apparatus of claim 16, wherein determining whether the application is the game application includes determining whether the application is the game application requesting the game service or a streaming application requesting a streaming service, and further comprising:
in response to determining that the application is the streaming application requesting the streaming service, processing an audio track of a stream using the filter, and
transmitting the processed audio track to the requesting user device.

* * * * *